Patented Oct. 5, 1926.

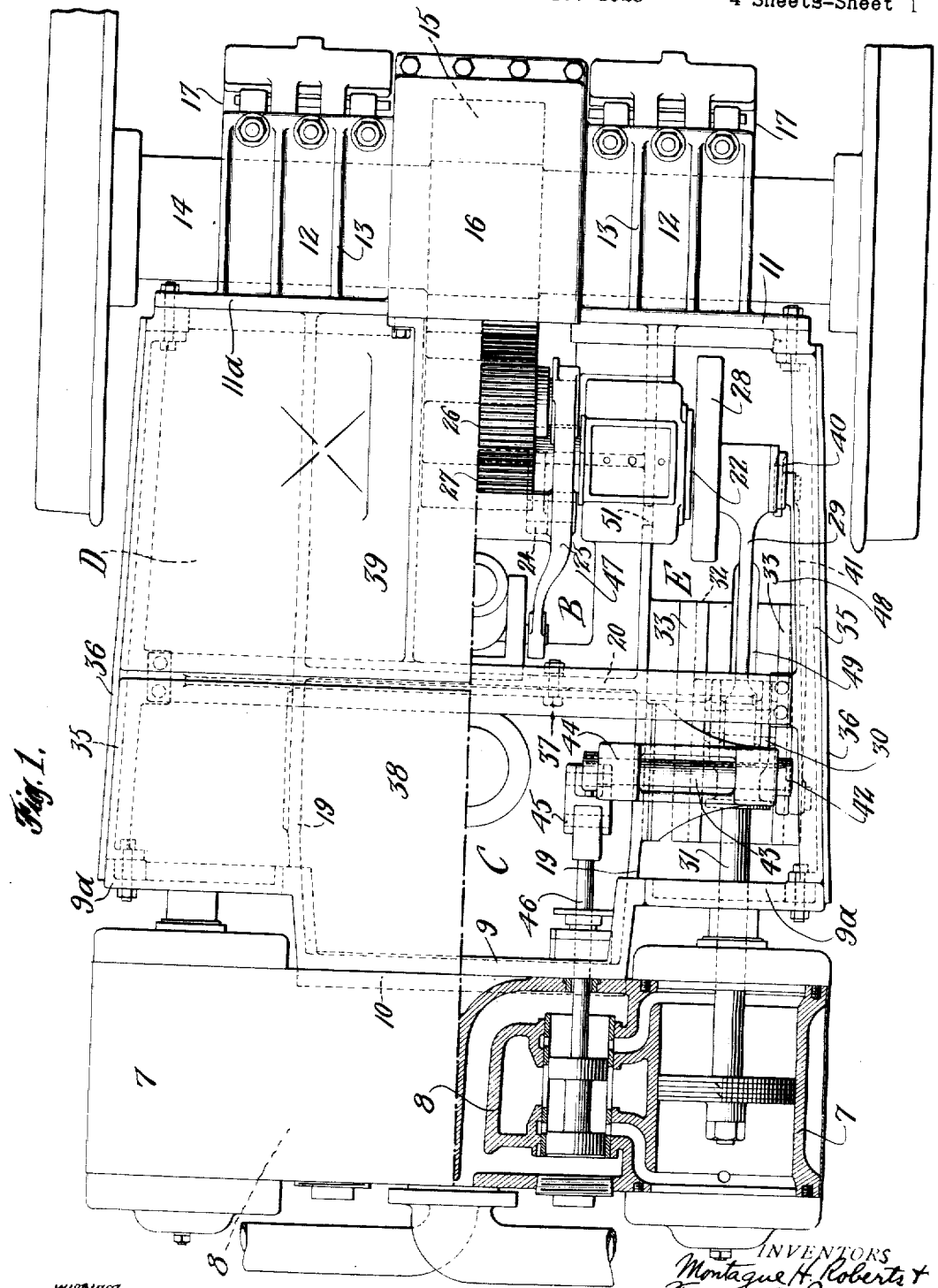

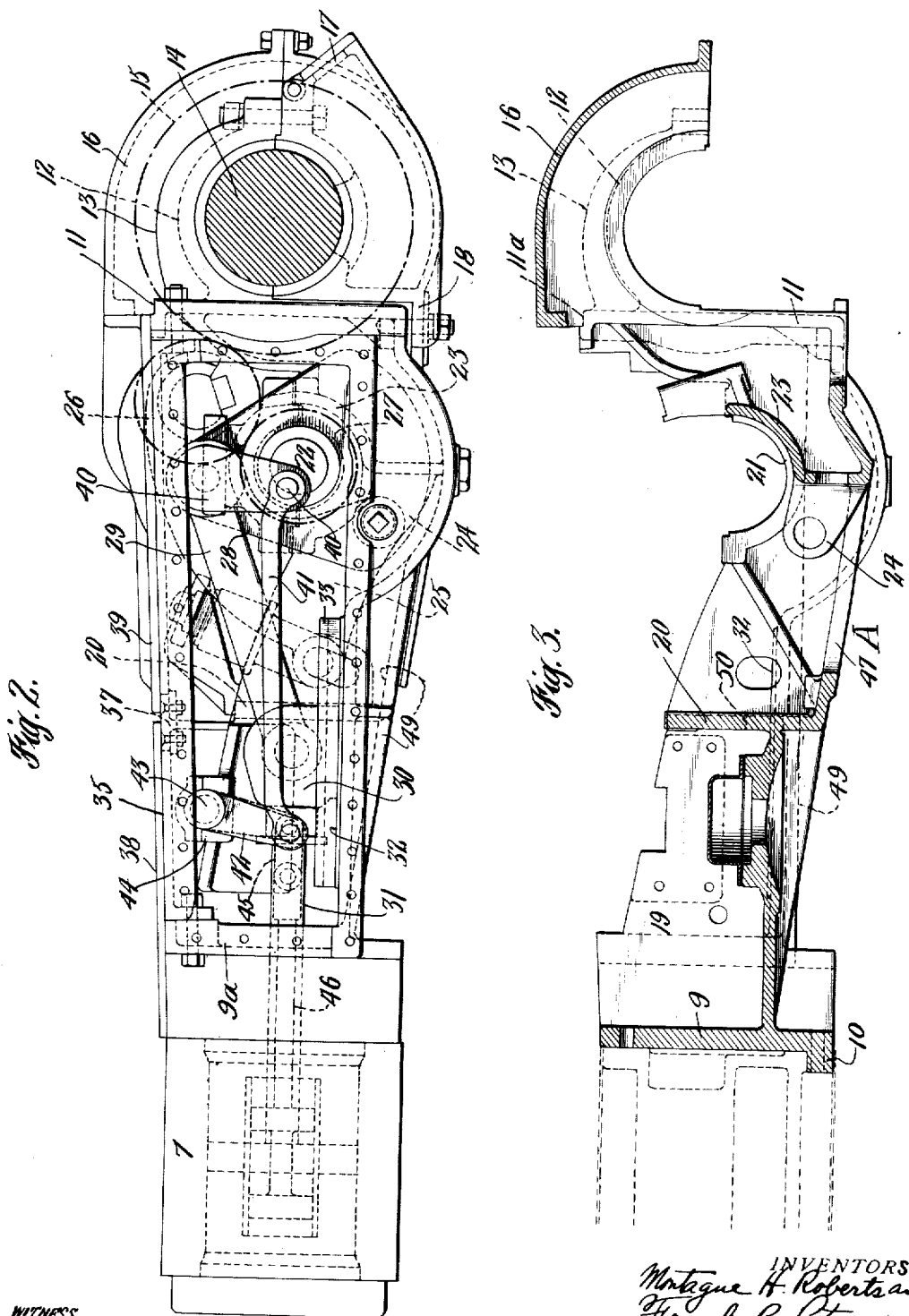

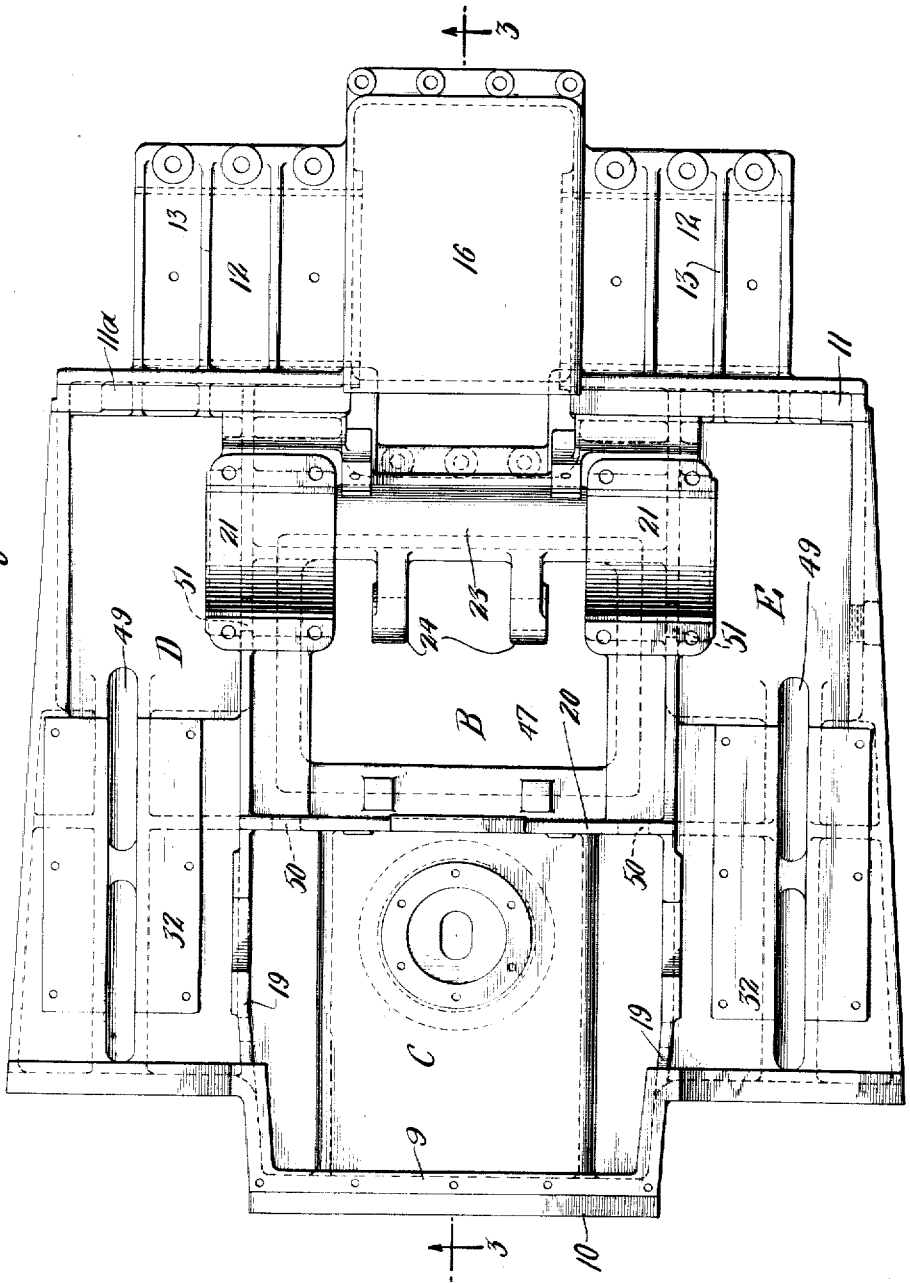

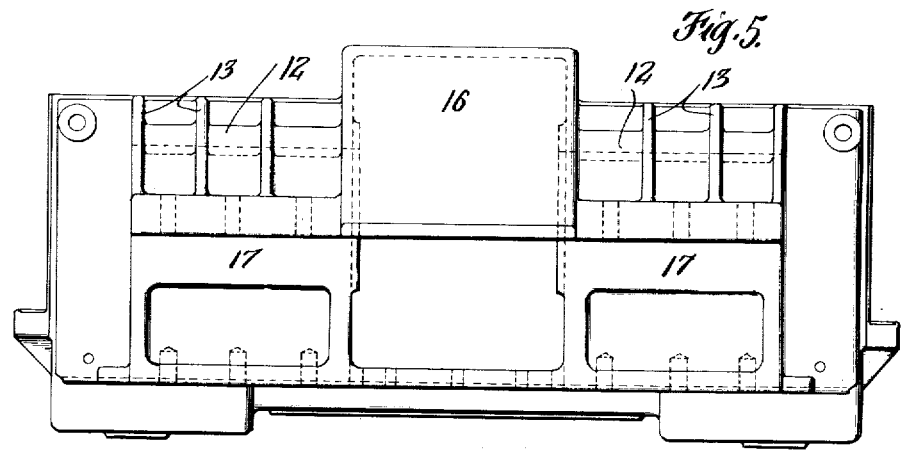
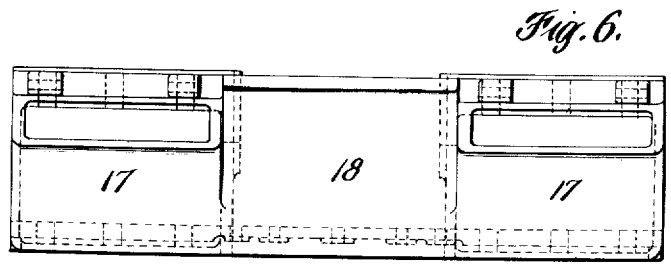
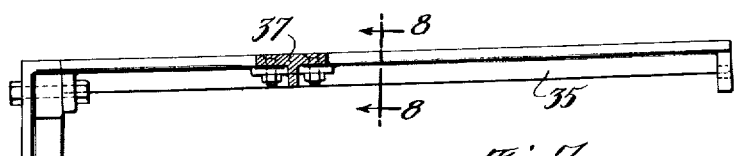
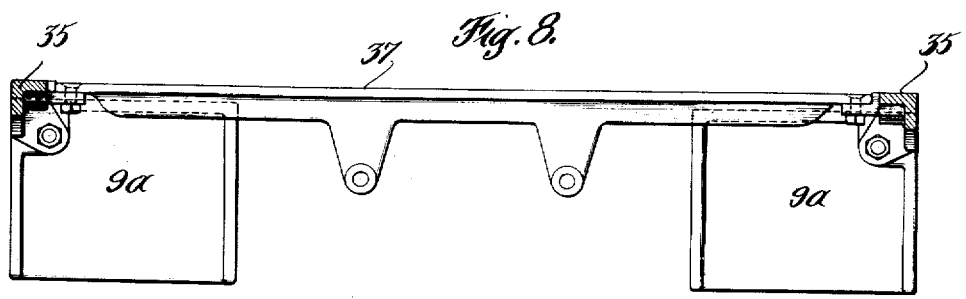

1,602,124

UNITED STATES PATENT OFFICE.

MONTAGUE H. ROBERTS, OF ENGLEWOOD, NEW JERSEY, AND FRANK R. PETERS, OF NEW YORK, N. Y., ASSIGNORS TO FRANKLIN RAILWAY SUPPLY COMPANY, A CORPORATION OF DELAWARE.

LOCOMOTIVE BOOSTER.

Application filed March 10, 1923. Serial No. 624,207.

This invention relates to locomotive boosters and particularly to the booster motor bed plate construction.

The booster devices to which this invention relates are ordinarily applied to the trailing truck of the locomotive and the service conditions to which they are subjected are most severe and the space available for their application is very small.

It is one of the primary objects of our invention to provide an improved construction which is strong and durable, is compact so that it may be applied, is accessible for inspection and adjustment of the parts, etc., and is easy to assemble and take apart; and, at the same time, being so arranged that the necessary machining of the parts, particularly the bed plate proper, can be readily done and the manufacture simplified and cheapened in other ways.

Still another object is to provide a construction of the character described in which the lubrication of the working parts is simple and effective.

The foregoing, together with such other objects as may hereinafter appear or are incident to our invention, we obtain by means of a construction which we have illustrated in preferred form in the accompanying drawings, wherein:

Fig. 1 is a partial plan and sectional view illustrating a booster for a trailer truck embodying our invention; Fig. 2 is a cross section and side elevation of Fig. 1, with certain of the enclosing plates removed; Fig. 3 is a section taken on the line 3—3 of Fig. 4; Fig. 4 is a plan view of the booster bed plate proper; Fig. 5 is an end elevation of Fig. 4; Fig. 6 is an end elevation of a combined bearing cap and carrying structure forming a detail of our improvements; Fig. 7 is a partial section and side elevation of details of our improvements; and Fig. 8 is a section taken on the line 8—8 of Fig. 7.

Referring now to the drawings, the cylinders 7 and the valve chests 8 of the booster engine are cast en bloc and bolted to the wall 9 rising from the rear portion of the bed plate, indicated as a whole by the reference letter A. This wall 9 has a ledge 10 at the bottom upon which the cylinder and valve chest casting is supported so as to relieve the attaching bolts of the load.

The bottom or bed plate portion proper, generally speaking, extends downwardly and forwardly from the wall 9 toward the front end, from which end walls 11 and 11ª rise, such walls being spaced apart. The rising portions 11 and 11ª respectively extend laterally approximately to the edges of the bed plate and projecting forwardly from each of said portions is an inverted bearing pillow 12, suitably reinforced by the ribs 13 and adapted to fit down over the axle 14 of the trailing truck, one on either side of the gear 15 for driving such axle.

The rear wall 9, the rising portions 11 and 11ª, and the bearing pillows 12 are cast integral with the bed, and the bearing pillows are tied together by means of a combined tie and hood or shroud member 16, preferably cast integral with the bearing pillows, such member being adapted to shroud the upper portion of the gear 15 on the axle 14. A bearing cap 17 is adapted to be bolted to each of the pillows and the bed plate, as indicated in Fig. 2, such bearing caps, however, being tied together by a tie piece 18 (see Fig. 6) which tie piece also acts as a shroud or hood cooperating with the hood portion 16 to enclose the gear 15 in advance of the portions 11 and 11ª. The bearing caps and this combined tying and hood piece 18 are also preferably cast integral.

This constitutes a simple arrangement permitting of ready assemblage and tearing down, but providing a rigid support for the axle bearings, which is of great importance.

The wall portion 9 does not extend out to the lateral side edges of the bed plate but terminates in the region of the inner portions of the cylinders 7, and a rib 19 leads forwardly from each end of the wall 9 to respective front rising portions 11 and 11ª, such ribs being formed integral with the bed plate and extending in substantial parallelism. Another web 20 extends transversely of the bed plate intermediate its ends, merging into the longitudinal ribs 19, and cooperating therewith to divide the bed plate into four general compartments, two central ones B and C and one on each side, D and E, flanking the central divisions.

The ribs 19 tie the front and rear rising portions together, stiffen the bed plate and cooperate with the rib 20 to further stiffen the bed plate.

Formed integrally with the ribs 19 and located immediately in the rear of the portions 11 and 11ᵃ are pillows 21 for the crank shaft 22, such bearing pillows being tied together transversely by means of a tying web or rib 23, preferably formed integral therewith, from which tying web a pair of lugs 24 extend rearwardly, to which lugs the rocker 25 carrying the idler entraining gear 26 is pivoted. In Fig. 2 this idler gear is shown in mesh with the axle gear 15 and the driving gear 27 of the crank shaft 22.

The compartment B, therefore, receives the crank shaft and its driving gear, the idler gear and its operating mechanism.

The cranks 28, of course, lie in the compartments D and E as do the connecting rods 29, connected thereto, and the cross heads 30 for the piston rods 31. The bed is provided with a pad 32 in the bottom portion of each compartment of divisions D and E, which pad is machined for the cross head and guides 33.

The rear of the compartments D and E are closed by the wall portions 9ᵃ which, however, are not made integral with the bed plate but constitute pieces which are welded in place after the pads have been properly machined. The piston rods 31, of course, are passed through these wall portions 9ᵃ. Tie members 35 connect the upper outer corners of the portions 11 and 11ᵃ with the corresponding portions of the walls 9ᵃ, such tie members also being made separate to permit of the machining of the bed plates, and are afterwards welded in place. The sides of the compartments D and E are closed by the plates 36. Intermediate their ends, the tying members 35 are tied together by a cross piece 37 (see Figs. 1, 7 and 8) and the top of the compartments B, C, D and E are closed by the plates 38 and 39.

The valve motion parts lie partly within the compartments D and E and the compartment C, such parts including the eccentric 40, the connecting rod 41, the crank arm 42, the shaft 43 and its bearing parts 44 and the crank arm 45 connected to the valve stem 46, such valve stem extending through the wall 9.

The ribs forming the various divisions or compartments terminate short of the top closure plates so that all of such compartments communicate at the top. The compartment B and the forward ends of the compartments D and E have openings 47 and 48 in the bottom providing access to the interior, such openings being covered by suitable cover plates. Oil is splashed all over the working parts by the crank, the oil running down from the horizontal portions at the rear of the compartments D and E for the cross head into the front portion of such compartments by virtue of the grooves or channels 49, and work forwardly from the compartment C through the holes 50 in the rib 20. Oil works from the compartment B to compartments D and E through the holes 51.

It will be seen from the foregoing that the apparatus described obtains the objects set forth and that in addition many of the bed plates parts are made integral and that other parts thereof are welded so that the severe racking which occurs in service does not produce loosening of the parts.

Other advantages will occur to those skilled in the art.

What we claim is:

1. In a booster motor, a bed plate having a pair of inverted axle bearing pillows projecting from the forward end thereof and spaced so as to lie on either side of the axle gear, a tie between pillows acting as a hood portion for such gear, a pair of bearing caps, and a tie between the caps also serving as a hood portion for such gear.

2. In a booster motor, a bed plate having a pair of inverted axle bearing pillows projecting from the forward end thereof and spaced so as to lie on either side of the axle gear, a tie between pillows acting as a hood portion for such gear, a pair of bearing caps, and a tie between the caps also serving as a hood portion for such gear, such ties being respectively integral with the pillows and the caps.

3. A booster motor bed plate having a pair of inverted axle bearing pillows at the forward end thereof and having an upstanding flange or wall at the rear end for the attachment of the booster cylinders en bloc provided with a ledge portion for supporting said cylinders.

4. A booster motor bed plate having a pair of inverted axle bearing pillows at the forward end thereof, means at the rear end thereof for attachment of the booster engine cylinders, and longitudinal stiffening means tying the ends of the plate.

5. A booster motor bed plate having a pair of inverted axle bearing pillows at the forward end thereof, means at the rear end thereof for attachment of the booster engine cylinders, and a pair of longitudinal ribs tying the ends of the plate.

6. A booster motor bed plate having a rising portion at its forward end with inverted bearing pillow means projecting forwardly from the upper part thereof, and having crank shaft bearing pillow means to the rear of said rising portion, the body of the bed plate sloping generally from such rising portion upwardly for maintaining a body of oil for splashing purposes.

7. A booster motor bed plate having rising portions at front and rear to provide axle bearing means and engine attaching means respectively; and intersecting stiffening ribs arranged to provide four compartments, two aligned central ones and one on each side of the two; the forward central one being adapted to form a crank shaft chamber; the outer two, compartments for the piston rods, connecting rods and cross heads; and the rear central one, a compartment for valve motion means.

8. A booster motor bed plate having rising portions at front and rear to provide axle bearing means and engine attaching means respectively; and intersecting stiffening ribs arranged to provide four compartments, two aligned central ones and one on each side of the two; the forward central one being adapted to form a crank shaft chamber; the other two, compartments for the piston rods, connecting rods and cross heads; and the rear central one, a compartment for valve motion means; all said compartments communicating for the distribution of oil by splashing and its collection for redistribution.

9. A booster bed plate open at the top and sides and having axle and crank shaft bearings, and longitudinal tying means connecting the upper portions of the ends and adapted to support top and side closure means.

10. A booster bed plate having a rising portion at front and rear and two longitudinal ribs connecting the rising portions disposed so as to provide a central compartment and side compartments flanking the central compartment; the central compartment being adapted to receive the crank shaft and the side compartments the piston cross heads and connecting rods.

11. A booster bed plate having a rising portion at the front and a rising portion at the rear terminating short of each side edge of the plate, and a rib leading forward from each end of the rear rising portion to the front rising portion.

12. A booster bed plate having a rising portion at the front and a rising portion at the rear terminating short of each side edge of the plate, and a rib leading forward from each end of the rear rising portion to the front rising portion, together with a transverse rib intermediate the ends of the plate.

13. A booster bed plate having a rising portion at the front and a rising portion at the rear terminating short of each side edge of the plate, and a rib leading forward from each end of the rear rising portion to the front rising portion, the portions of the bed plate beyond the ribs having a pad for the crosshead guides.

14. A booster bed plate having a rising portion at front and rear and two longitudinal ribs connecting the rising portions, said ribs being provided with crankshaft bearing pillows.

15. A booster bed plate having a rising portion at front and rear and two longitudinal ribs connecting the rising portions, said ribs being provided with crankshaft bearing pillows, together with a rib tying the longitudinal ribs in proximity to the pillows.

16. A booster bed plate having a rising portion at front and rear and two longitudinal ribs connecting the rising portions, said ribs being provided with crankshaft bearing pillows, together with a rib tying the longitudinal ribs in proximity to the pillows; all cast integral.

17. A booster bed plate having a rising portion at front and rear and two longitudinal ribs connecting the rising portions, all cast integral, and longitudinal tying members welded to the plate.

18. A booster motor plate construction provided with walls dividing the same into compartments receiving parts of the motor, said compartments communicating at the top for splash lubrication and at the bottom for the collection of the oil.

In testimony whereof, we have hereunto signed our names.

MONTAGUE H. ROBERTS.
FRANK R. PETERS.

ments, two aligned central ones and one on each side of the two; the forward central one being adapted to form a crank shaft chamber; the outer two, compartments for the piston rods, connecting rods and cross heads; and the rear central one, a compartment for valve motion means.

8. A booster motor bed plate having rising portions at front and rear to provide axle bearing means and engine attaching means respectively; and intersecting stiffening ribs arranged to provide four compartments, two aligned central ones and one on each side of the two; the forward central one being adapted to form a crank shaft chamber; the other two, compartments for the piston rods, connecting rods and cross heads; and the rear central one, a compartment for valve motion means; all said compartments communicating for the distribution of oil by splashing and its collection for redistribution.

9. A booster bed plate open at the top and sides and having axle and crank shaft bearings, and longitudinal tying means connecting the upper portions of the ends and adapted to support top and side closure means.

10. A booster bed plate having a rising portion at front and rear and two longitudinal ribs connecting the rising portions disposed so as to provide a central compartment and side compartments flanking the central compartment; the central compartment being adapted to receive the crank shaft and the side compartments the piston cross heads and connecting rods.

11. A booster bed plate having a rising portion at the front and a rising portion at the rear terminating short of each side edge of the plate, and a rib leading forward from each end of the rear rising portion to the front rising portion.

12. A booster bed plate having a rising portion at the front and a rising portion at the rear terminating short of each side edge of the plate, and a rib leading forward from each end of the rear rising portion to the front rising portion, together with a transverse rib intermediate the ends of the plate.

13. A booster bed plate having a rising portion at the front and a rising portion at the rear terminating short of each side edge of the plate, and a rib leading forward from each end of the rear rising portion to the front rising portion, the portions of the bed plate beyond the ribs having a pad for the crosshead guides.

14. A booster bed plate having a rising portion at front and rear and two longitudinal ribs connecting the rising portions, said ribs being provided with crankshaft bearing pillows.

15. A booster bed plate having a rising portion at front and rear and two longitudinal ribs connecting the rising portions, said ribs being provided with crankshaft bearing pillows, together with a rib tying the longitudinal ribs in proximity to the pillows.

16. A booster bed plate having a rising portion at front and rear and two longitudinal ribs connecting the rising portions, said ribs being provided with crankshaft bearing pillows, together with a rib tying the longitudinal ribs in proximity to the pillows; all cast integral.

17. A booster bed plate having a rising portion at front and rear and two longitudinal ribs connecting the rising portions, all cast integral, and longitudinal tying members welded to the plate.

18. A booster motor plate construction provided with walls dividing the same into compartments receiving parts of the motor, said compartments communicating at the top for splash lubrication and at the bottom for the collection of the oil.

In testimony whereof, we have hereunto signed our names.

MONTAGUE H. ROBERTS.
FRANK R. PETERS.

Certificate of Correction.

It is hereby certified that in Letters Patent No. 1,602,124, granted October 5, 1926, upon the application of Montague H. Roberts, of Englewood, New Jersey, and Frank R. Peters, of New York, N. Y., for an improvement in " Locomotive Boosters," an error appears in the printed specification requiring correction as follows: Page 3, line 16 for the word " other " read *outer;* and that the said Letters Patent should be read with this correction therein that the same may conform to the record of the case in the Patent Office.

Signed and sealed this 26th day of October, A. D. 1926.

[SEAL.]
WM. A. KINNAN,
*Acting Commissioner of Patents.*

DISCLAIMER 1,602,124.—*Montague H. Roberts*, Englewood, N. J., and *Frank R. Peters*, New York, N. Y. LOCOMOTIVE BOOSTER. Patent dated October 5, 1926. Disclaimer filed April 5, 1933, by the assignee, *Franklin Railway Supply Company*.

Hereby enters this disclaimer to that part of the claims in said specification which is in the following words, to wit:

"3. A booster motor bed plate having a pair of inverted axle bearing pillows at the forward end thereof and having an upstanding flange or wall at the rear end for the attachment of the booster cylinders en bloc provided with a ledge portion for supporting said cylinders."

"18. A booster motor plate construction provided with walls dividing the same into compartments receiving parts of the motor, said compartments communicating at the top for splash lubrication and at the bottom for the collection of the oil."

[*Official Gazette May 9, 1933.*]

DISCLAIMER 1,602,124.—*Montague H. Roberts*, Englewood, N. J., and *Frank R. Peters*, New York, N. Y. LOCOMOTIVE BOOSTER. Patent dated October 5, 1926. Disclaimer filed October 23, 1934, by the assignee, *Franklin Railway Supply Company*.

Hereby enters this disclaimer to that part of the claims in said specification which is in the following words, to wit:

"1. In a booster motor, a bed plate having a pair of inverted axle bearing pillows projecting from the forward end thereof and spaced so as to lie on either side of the axle gear, a tie between pillows acting as a hood portion for such gear, a pair of bearing caps, and a tie between the caps also serving as a hood portion for such gear.

"2. In a booster motor, a bed plate having a pair of inverted axle bearing pillows projecting from the forward end thereof and spaced so as to lie on either side of the axle gear, a tie between pillows acting as a hood portion for such gear, a pair of bearing caps, and a tie between the caps also serving as a hood portion for such gear, such ties being respectively integral with the pillows and the caps."

"4. A booster motor bed plate having a pair of inverted axle bearing pillows at the forward end thereof, means at the rear end thereof for attachment of the booster engine cylinders, and longitudinal stiffening means tying the ends of the plate.

"5. A booster motor bed plate having a pair of inverted axle bearing pillows at the forward end thereof, means at the rear end thereof for attachment of the booster engine cylinders, and a pair of longitudinal ribs tying the ends of the plate."

"10. A booster bed plate having a rising portion at front and rear and two longitudinal ribs connecting the rising portions disposed so as to provide a central compartment and side compartments flanking the central compartment; the central compartment being adapted to receive the crank shaft and the side compartments the piston cross heads and connecting rods."

"14. A booster bed plate having a rising portion at front and rear and two longitudinal ribs connecting the rising portions, said ribs being provided with crankshaft bearing pillows.

"15. A booster bed plate having a rising portion at front and rear and two longitudinal ribs connecting the rising portions, said ribs being provided with crankshaft bearing pillows, together with a rib tying the longitudinal ribs in proximity to the pillows.

"16. A booster bed plate having a rising portion at front and rear and two longitudinal ribs connecting the rising portions, said ribs being provided with crankshaft bearing pillows, together with a rib tying the longitudinal ribs in proximity to the pillows; all cast integral."

[*Official Gazette November 13, 1934.*]